United States Patent
Kong et al.

(10) Patent No.: US 10,757,181 B1
(45) Date of Patent: Aug. 25, 2020

(54) DYNAMIC BALANCING OF OPERATIONS BY SELECTING SUBSETS OF NODES

(71) Applicant: Palantir Technologies Inc., Palo Alto, CA (US)

(72) Inventors: Jeremy Kong, London (GB); Thomas Boam, Hertfordshire (GB); Robert Hero, Yarmouth, MA (US)

(73) Assignee: Palantir Technologies Inc., Palo Alto, CA (US)

( * ) Notice: Subject to any disclaimer, the term of this patent is extended or adjusted under 35 U.S.C. 154(b) by 81 days.

(21) Appl. No.: 15/980,591

(22) Filed: May 15, 2018

Related U.S. Application Data

(60) Provisional application No. 62/642,903, filed on Mar. 14, 2018.

(51) Int. Cl.
   *H04L 29/08* (2006.01)
   *G06F 16/23* (2019.01)

(52) U.S. Cl.
   CPC ...... *H04L 67/1031* (2013.01); *G06F 16/2322* (2019.01); *G06F 16/2343* (2019.01); *G06F 16/2379* (2019.01); *H04L 67/101* (2013.01); *H04L 67/1008* (2013.01)

(58) Field of Classification Search
   CPC ............ H04L 67/1031; H04L 67/1008; H04L 67/101; G06F 16/2379; G06F 16/2343; G06F 16/2322

USPC ........................................................ 709/223
See application file for complete search history.

(56) References Cited

U.S. PATENT DOCUMENTS

| | | | |
|---|---|---|---|
| 9,705,986 B2 * | 7/2017 | Caruana | G06F 16/258 |
| 2005/0198335 A1 * | 9/2005 | Brown | H04L 67/1008 |
| | | | 709/229 |
| 2010/0262695 A1 * | 10/2010 | Mays | G06F 9/5027 |
| | | | 709/226 |
| 2016/0234297 A1 * | 8/2016 | Ambach | H04L 67/1008 |
| 2018/0077214 A1 * | 3/2018 | Fawcett | G06F 16/24568 |
| 2018/0167460 A1 * | 6/2018 | Hsieh | G06F 16/1767 |
| 2018/0183862 A1 * | 6/2018 | Huh | H04L 12/185 |

* cited by examiner

*Primary Examiner* — Joseph L Greene
(74) *Attorney, Agent, or Firm* — Sheppard Mullin Richter & Hampton LLP

(57) ABSTRACT

Systems, methods, and non-transitory computer readable media are provided for load balancing of operations. A set of operation nodes may be run. The set of operation nodes may include operation nodes configured to perform operations. A set of clients that uses one or more of the operations may be identified. Loads of operations associated with the set of clients may be determined. Subsets of operation nodes to be assigned to subsets of clients may be identified based on the loads of operations associated with the set of clients. The subsets of operation nodes may include a given subset of operation nodes to be assigned to a given subset of clients. The subsets of operation nodes may be assigned to the subsets of clients such that the given subset of operation nodes is assigned to perform one or more of the operations for the given subset of clients.

20 Claims, 6 Drawing Sheets

DYNAMIC BALANCING OF OPERATIONS BY SELECTING SUBSETS OF NODES

CROSS REFERENCE TO RELATED APPLICATIONS

This application claims the benefit under 35 U.S.C. § 119(e) of U.S. Provisional Application Ser. No. 62/642,903, filed Mar. 14, 2018, the content of which is incorporated by reference in its entirety into the present disclosure.

FIELD OF THE INVENTION

This disclosure relates to approaches for balancing loads of operations.

BACKGROUND

Operation nodes may facilitate operations for one or more transactions. For example, timelock nodes may facilitate assignment of timestamps for transactions and locking of the timestamps. Increasing the number of operation nodes may have detrimental effect on system operations. For example, increasing timelock nodes may result in increased latency for timelock operations performed by the timelock nodes. Increasing the number of timelock nodes to provide services for greater number of transactions may result in poor performance.

SUMMARY

Various embodiments of the present disclosure may include systems, methods, and non-transitory computer readable media configured to facilitate load balancing of operations. A set of operation nodes may be run. The set of operation nodes may include operation nodes configured to perform operations. A set of clients that uses one or more of the operations may be identified. Loads of operations associated with the set of clients may be determined. Subsets of operation nodes to be assigned to subsets of clients may be identified based on the loads of operations associated with the set of clients. The subsets of operation nodes may include a given subset of operation nodes to be assigned to a given subset of clients. The subsets of operation nodes may be assigned to the subsets of clients such that the given subset of operation nodes is assigned to perform one or more of the operations for the given subset of clients.

In some embodiments, the subset of operation nodes may include an odd number of the operation nodes.

In some embodiments, the loads of operations may be determined based on historical operation usage information for the set of clients. The historical operation usage information may include information relating to request rates, processing loads, and latency measurements of historical operation usage by the set of clients.

In some embodiments, the operations may include assigning a timestamp to a transaction associated with a given client, assigning a lock on the timestamp, refreshing the lock on the timestamp during execution of the transaction, and removing the lock on the timestamp. The transaction may be facilitated by a transaction layer built on top of a key value store.

In some embodiments, one or more of the operations may be performed by a given subset of operation nodes based on a consensus of operation nodes within the given subset of operation nodes.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
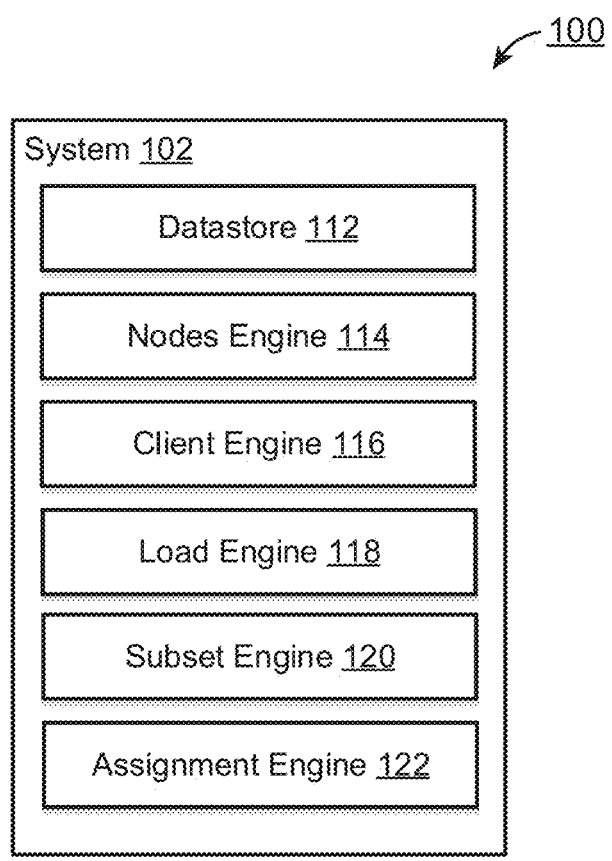
FIG. 1 illustrates an example environment for balancing loads of operations, in accordance with various embodiments.

A claimed solution rooted in computer technology overcomes problems specifically arising in the realm of computer technology. In various implementations, a system may run a set of operation nodes. The set of operation nodes may include operation nodes configured to perform operations. A set of clients that uses one or more of the operations may be identified. Loads of operations associated with the set of clients may be determined. Subsets of operation nodes to be assigned to subsets of clients may be identified based on the loads of operations associated with the set of clients. The subsets of operation nodes may include a given subset of operation nodes to be assigned to a given subset of clients. The subsets of operation nodes may be assigned to the subsets of clients such that the given subset of operation nodes is assigned to perform one or more of the operations for the given subset of clients.

The loads of operations may be determined based on historical operation usage information for the set of clients. The historical operation usage information may include information relating to request rates, processing loads, and latency measurements of historical operation usage by the set of clients.

The operations may include assigning a timestamp to a transaction associated with a given client, assigning a lock on the timestamp, refreshing the lock on the timestamp during execution of the transaction, and removing the lock on the timestamp. The transaction may be facilitated by a transaction layer built on top of a key value store.

One or more of the operations may be performed by the given subset of operation nodes based on a consensus of operation nodes within the given subset of operation nodes. The subset of operation nodes may include an odd number of the operation nodes.

The approaches disclosed herein may facilitate scaling (e.g., horizontal scaling) of systems using operation nodes/operations, such as timelock nodes/timelock operations. Balancing loads of operations among clients may enable systems to have and/or use an increased number of operation nodes without affecting, or minimally affecting, the performance of the systems. For example, use of timelock nodes may enable validation of database operations in a highly available and highly scalable manner for transactions on data stored in databases. Increasing the number of timelock nodes may enable provision of timelock operations even when a number of timelock nodes are inoperable. For example, timelock operations may be provided for clients even when a minority of timelock nodes crash and/or otherwise become unavailable. However, increasing the number of timelock nodes may result in timelock operations becoming more expensive. For example, increasing the number of timelock nodes may result in timelock operations taking more processing time and/or processing resources as clients communicate with a greater number of timelock nodes, and as timelock nodes internally communicate with a greater number of timelock nodes when achieving consensus. The approaches disclosed herein enable scaling of operation nodes such that the expense of increasing the number of operation nodes, such as the timelock nodes, is reduced (e.g., minimized).

While the disclosure is described herein with respect to transactions on data in databases, timelock nodes, and timelock operations, this is merely for illustrative purposes and is not meant to be limiting. The approaches disclosed herein may provide load balancing of other operations and/or scaling of other types of operation nodes. The approaches disclosed herein may provide load balancing of operations for performing transactions on other types of data/other types of transactions.

FIG. 1 illustrates an example environment 100 for balancing loads of operations. The example environment 100 may include a computing system 102. The computing system 102 may include one or more processors and memory. The processor(s) may be configured to perform various operations by interpreting machine-readable instructions stored in the memory. The environment 100 may also include one or more datastores (not shown) that is accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a datastore 112, a node engine 114, a client engine 116, a load engine 118, a subset engine 120, an assignment engine 122, other engines, and/or other components. The datastore 112 may include structured and/or unstructured sets of data that can be divided/extracted for provision when needed by one or more components of the environment 100. The datastore 112 may include one or more datasets of information. The datastore 112 may include one or more databases. The datastore 112 may include different data analysis modules that facilitate different data analysis tasks, patches for the applications/systems, custom application/functionalities built for particular application/systems, and/or other information to be used in the environment 100. While the computing system 102 is shown in FIG. 1 as a single entity, this is merely for ease of reference and is not meant to be limiting. One or more components/functionalities of the computing system 100 described herein may be implemented in a single computing device or multiple computing devices.

The node engine 114 may be configured to run one or more sets of operation nodes. A set of operation nodes may include one or more operation nodes. An operation node may refer to a service that executes actions relating to a transaction, an operation for a transaction, and/or other services for one or more computing systems. For example, an operation node may include a timelock node. Timelock nodes may be highly available. A timelock node may refer to a service that executes actions relating to timestamps or locks. A timestamp may refer to a sequence of characters and/or other information that identifies when a certain event occurred. A timestamp may refer to logical timestamps that do not have relation to actual time. In some embodiments, timestamps may include vector clocks. In some embodiments, timestamps may be assigned as signed 64-bit integers. Other types/sizes of timestamps are contemplated. Other types of operation nodes and/or services are contemplated.

Timestamps may be used to process transactions in order on data in a database. Timestamps may be checked to determine which data should be used to perform a given transaction. For example, timestamps may be used to determine which data may be appropriate for a given transaction and which data may be too new/old for the given transaction. A given transaction/given operation(s) of a transaction may be associated with multiple timestamps. For example, a first timestamp may be assigned to the given operation/transaction at the beginning of the operation/transaction. The data import/export/modification may be performed based on the operation/transaction, and the result of the operation/transaction may be committed at a second timestamp. The first and/or the second timestamp may be used to confirm the data being used/modified in the operation/transaction.

A timestamp may be assigned based on an order in which the transaction is received with respect to other transactions. For non-overlapping timestamp requests, the assigned timestamps may be monotonically increasing. For example, a first timestamp request may start and end before a second timestamp request start. For such timestamp requests, the timestamp assigned to the first timestamp request may be smaller than the timestamp assigned to the second timestamp request. For overlapping timestamp requests, the assigned timestamps may not be monotonically increasing. For example, a first timestamp request may start, and a second timestamp request start before the first timestamp request ends. For such timestamp requests, the timestamp assigned to the first timestamp request may be smaller or larger than the timestamp assigned to the second timestamp request. The assigned timestamps may or may not be consecutive.

Timestamps may be used to determine ordering and/or validity of transactions. Timestamps may be used to process transactions in order on data in a database. A transaction may refer to a request/command to perform/execute one or more processes on data and/or other information. A transaction may refer to a grouping/sequence of information processing that is treated as a unit to satisfy a request and for ensuring database integrity.

A timelock node may be configured to perform timelock operations and/or other operations. Timelock operations may refer to operations relating to timestamps. For example, timelock operations may include operations for issuing timestamps, locking timestamps, refreshing locks on timestamps, removing locks on timestamps, and/or other operations relating to timestamps. For instance, timelock operations for a transaction associated with a client (e.g., a transaction requested by the client, a transaction for the client, a transaction directed at the client) may include assigning a timestamp to the transaction, assigning a lock on the timestamp, refreshing the lock on the timestamp during execution of the transaction, removing the lock on the timestamp, and/or other operations relating to the timestamp. Other types of operations are contemplated.

In some embodiments, a transaction may be facilitated by a transaction layer built on top of a (e.g., generic) key value store (e.g., database). Having the transaction layer between client code and underlying key value store may enable online migration from one store to another. The transaction layer may provide indexing of transactions. The transaction layer backed services may be validated via operation of an embedded locking service—that is, individual transaction layer backed services may include a locking service. However, having embedded locking services may be expensive and/or may not be scalable. External (e.g., dedicated) locking services may reduce the resources needed/consumed for providing validation of database operations backed by a transaction layer—that is, individual locking services may be no longer required per individual transaction layer backed service. Moreover, switching from embedded to external locking services may reduce persistence in services and may turn services into stateless services, which may be beneficial for ensuring availability.

In some embodiments, one or more of the operations (e.g., timelock operations) may be performed by a subset of operation nodes (e.g., timelock nodes) based on a consensus of operation nodes within the subset of operation nodes. A subset of operation nodes may include one, some or all of the operation nodes run by the nodes engine 114. In some embodiments, a subset of operation nodes may include an odd number of operation nodes. For example, a subset of timelock nodes may include three dedicated timelock nodes individually running a timestamp service, and the three timestamp services may communicate with each other to come to a consensus on the value of the timestamps. For example, three timelock nodes A, B, and C may individually run a timestamp service. The timelock node A may receive a request for a timestamp. Based on the reception of the timestamp request, the timelock node A may check with the timelock node B and the timelock node C on the value of the timestamp to be issued before issuing the timestamp. Because of the time/resources required to form a consensus among the timelock nodes (e.g., the timestamp services running on the timelock nodes), ranges of timestamps may be confirmed at a time.

Having three (or more) timestamp services enables provision of timestamps when one (or a minority) of the timestamp services/timelock nodes is unavailable—that is, only a quorum of timestamp services (e.g., two timestamp services) are required to provide timestamps. One of the benefits of such approach is high availability of timestamps for transactions/services—timestamps may be issued/assigned as long as a majority of the nodes in the cluster are available and can communicate. Use of dedicated timestamp services/timelock nodes enables segregation of codes for timestamp provision from other codes, and enables changes to the timestamp codes (e.g., updates, optimization) without requiring rebuild of other codes.

Updating timestamp records per individually issued/assigned timestamps may be resource intensive. Thus, rather than updating the timestamp records per timestamps, the timelock nodes (timestamp service running on the timelock nodes) may reserve multiple timestamps (e.g., a million timestamps) at a time, and update the bound of the timestamp record to be the end of the range. When a client requests a timestamp, the timelock nodes (timestamp service running on the timelock nodes) may issue timestamps from its range of timestamps, and may request more when necessary. Thus, only one "persist" action may be necessary for a grouping of timestamp (one per a million timestamps).

In some embodiments, the timestamps may be issued using a leader. One of the timelock nodes (a timestamp service running on one of the timelock nodes) in the subset of timelock nodes may be assigned to be the leader. The leader may be the only node that actually issues timestamps. The leader may also write an upper bound for the timestamps it has provided to a persistent store (e.g., timestamp table). The upper bound may be written before the timestamps are issued. Writing the upper bound before issuing the timestamp provides a safety mechanism—if a leader fails during an issuing process, the new leader will see the upper bound written by the previous leader. A leader may communicate with a quorum of nodes (timestamp services running on a quorum of nodes) to confirm that it is still the leader. In some embodiments, a leader may be selected based on a distributed consensus algorithm (e.g., Paxos).

In some embodiments, a lock (timelock) may be assigned on a timestamp based on consensus among timelock nodes within a subset of timelock nodes. For example, a subset of timelock nodes may include three dedicated timelock nodes individually running a timelock service, and the three timelock services may communicate with each other to come to a consensus on whether a lock should be assigned, refreshed, and/or removed. For example, referring to the example of timelock nodes A, B, and C, a lock operation (e.g., assigning, refreshing, removing) may requested to be performed on a timestamp from the timelock node A. Based on the request, the timelock node A may check with the timelock node B and the timelock node C on whether the lock operation should be performed.

Having three (or more) timelock services enables provision of timelock when one (or minority) of the timelock services/timelock nodes is unavailable—that is, only a quorum of timelock services (e.g., two timelock services) are required to provide timelocks. One of the benefits of such approach is high availability of timelocks for transactions/services—timelocks may be assigned/timestamps may be locked as long as a majority of the nodes in the cluster are available and can communicate. Use of dedicated timelock services/timelock nodes enables segregation of codes for validation of transactions/services from other codes, and enables changes to the validation codes (e.g., updates, optimization) without requiring rebuild of other codes.

A lock on a timestamp may indicate whether transaction/service associated with the timestamp is valid (transaction/service result should be committed) or invalid (transaction/service result should be rolled back). In some embodiment, a lock on a timestamp may include an opportunistic lock. A current/valid lock on a timestamp may indicate that the result of performing a transaction/service on a data is valid. In some embodiments, a lock on a timestamp (lock a timestamp, timelock) may be assigned based on an assignment of the timestamp. In some embodiment, a lock on a timestamp may be assigned after the relevant data has been read and/or written into a memory. In some embodiments, a lock on a timestamp may be assigned based on a request (e.g., from a client, a service node of the transaction/service) to lock the timestamp.

A lock on a timestamp may enable users to avoid modifying the same data at the same time and avoid data corruption. Responsive to a lock request, whether to assign a lock may be determined based on a review of one or more logs (e.g., internal has tables) of granted lock requests. If the data to be locked is present in the log(s), the timestamp may not be locked (a lock on the timestamp is not assigned in response to the request). If the data to be locked is not present in the log(s), the lock may be assigned to the timestamp. In some embodiments, locking of a timestamp may be performed by passing a lock token to the client. In some embodiments, locks may be stored in random access memory for fast access (e.g., for reading, writing, modifying).

A lock on a timestamp may be held for a given duration of time. In some embodiments, the lock may be held for the duration of the transaction/service. In some embodiments, the locks may be held for a portion of the duration of the transaction/service. For the lock to be held/remain valid, a refresh of the lock may be required.

A lock on a timestamp may be refreshed while the transaction on the data is performed. In some embodiments, the lock may be refreshed based on user input/system prompt to refresh the lock. In some embodiments, the lock may be refreshed based on a request (e.g., from a client, a service node of the transaction/service) to refresh the timestamp. In some embodiments, the lock may be refreshed based on the associated transaction/service being on-going. In some embodiments, the lock may be refreshed based on one or more rules (e.g., refreshing the lock based on occurrence/non-occurrence of a given criteria). Other basis for refreshing locks are contemplated.

If the lock is not refreshed, the lock may be lost/become invalid. A lock may be not refreshed/lost/become invalid when the associated transaction/service becomes invalid (e.g., the transaction/service is canceled; server running the transaction/service dies/disconnects). A lock may be removed or not refreshed based on user input/system prompt to remove the lock/not refresh the lock. Other basis for removing/not refreshing locks are contemplated.

The validity of a lock may be checked after the transaction is performed. Responsive to the lock being valid (the transaction being validated), the result of performing the transaction on the data may be committed. In some embodiments, the result of performing the transaction on the data may be committed to one or more version control tools/commit logs. Responsive to the lock being invalid (the transaction not being validated), the result of performing the transaction on the data may be removed. Changes (e.g., creation, modification, removal) to the data and/or other data based on the transaction may be reversed to restore the relevant data in database.

In some embodiments, the timelocks may be issued/timestamps may be locked using a leader. One of the timelock nodes (a timelock service running on one of the timelock nodes) may be assigned to be the leader. A request for a lock operation may be served by the leader. In some embodiments, a request for a lock operation received by a non-leader timelock node/service may be forwarded to the leader timelock node/service. In some embodiments, a request for a lock operation received by a non-leader timelock node/service may replied with a message that the respective timelock node/service is not the leader. A leader may communicate with a quorum of nodes (timelock services running on a quorum of nodes) to confirm that it is still the leader. In some embodiments, a leader may be selected based on a distributed consensus algorithm (e.g., Paxos).

In some embodiments, dedicated timelock nodes may be implemented within a separate processor (timelock processor). Individual timelock processors may contain implementations of multiple (e.g., three) timestamp services and timelock services. Use of a separate timelock processors enables a client obtaining timestamp/lock via communication with a single entity rather than with multiple entities.

The client engine 116 may be configured to identify one or more sets of clients that uses one or more operations. A set of clients may include one or more clients. A client may refer one or more pieces of computer hardware and/or software that accesses/requests one or more services made available by a server. A client may be associated with one or more transactions, regardless of whether or not the client interacts directly with engine(s) that facilitate the transaction (s). For example, a transaction may be requested by a client, performed for the client, directed at the client, and/or otherwise associated with the client. For example, the client engine 116 may be configured to identify one or more sets of clients that uses one or more timelock operations. In some embodiments, clients may utilize timelock operations outside of the context of transactions. For example, a client may use timestamps to provide identifiers guaranteed to be unique. The client engine 116 may be configured to identify one or more sets of clients that uses other operation(s).

The client engine 116 may identify clients that uses one or more operations at regular intervals or irregular intervals. The client engine 116 may identify clients that use one or more operations based on a scan of processes, events, and/or other information relating to the clients. The client engine 116 may identify clients that use one or more operations based on a change in a number of such clients (e.g., addition of a new client, removal of an existing client, suspension of a client). The client engine 116 may identify clients that use one or more operations based on a request for identification of such client, based on a request for a load balancing of operation, and/or based on other information. For example, the client engine 116 may identify four different clients (clients A, B, C, and D) as a set of clients that uses one or more timelock operations.

The load engine 118 may be configured to determine loads of operations (e.g., timelock operations) associated with the set(s) of clients that uses one or more operations (e.g., timelock operations). A load of operations associated with a client may refer to a measure of amount of computational resources for operations associated with the client. For example, a load of timelock operations associated with a client may refer to a measure of processing time, processing power, and/or other processing resources that is expected to be required to perform timelock operations associated with the client. The load engine 118 may determine loads of operations associated with the clients within a set of clients based on historical operation usage information for the clients. Historical operation usage information of a client may refer to information that characterizes prior load of operations for the client. For example, historical operation usage information for a client may include information relating to request rates, processing loads, latency measurements, and/or other information of historical operation usage by the client. Based on the historical operation usage information for a client, the load engine 118 may determine how much resources the client may require for timelock operations. For example, referring to the example of clients A, B, C, and D, the load engine 118 may determine loads of timelock operations individually associated with the clients A, B, C, and D based on historical operation usage information for the clients A, B, C, and D.

In some embodiments, historical operation usage information of a client may include information that characterizes recorded and/or predicted load of operations (e.g., timelock operations) for the client. For example, one or more previous operation usages of the client may be recorded for use in/as the historical operation usage information. As another example, a client may request operations similar to/same as another client, and the historical operation usage information of the client may include information that characterizes predicted load of operations for the client based on recorded load of operations for the other client. As another example, expected operations for a client may change (e.g., based on change to the client, change to an environment in which the client operates), and the historical operation usage information of the client may be changed based on the change in expected operations for the client and prior recorded/predicted load of operations for the client.

The subset engine 120 may be configured to identify one or more subsets of operation nodes to be assigned to one or more subsets of clients based on the loads of operations associated with the clients. The subset engine 120 may identify particular subsets of operation nodes for assignment to particular subsets of clients based on the amount of computational resources for operations associated with clients such that the loads are balanced across different subsets of operation nodes. For example, the subset engine 120 may be configured to identify one or more subsets of timelock nodes to be assigned to one or more subsets of clients based on the loads of timelock operations associated with the clients. For instance, referring to the example of clients A, B, C, and D, there may be five timelock nodes (timelock nodes A, B, C, D, and E) within a set of timelock nodes. The subset engine 120 may identify one or more subsets of timelock nodes to be assigned to one or more subsets of clients (including one or more of clients A, B, C, and D) based on the loads of timelock operations associated with the clients A, B, C, and D. For instance, the loads of timelock operations associated with the clients A, B, and C may be the same/similar to each other, while the load of timelock operations associated with the client D may be greater (e.g., five times greater) than the individual loads of timelock operations associated with the clients A, B, and C. The subset engine 120 may identify subsets of timelock nodes to be assigned to one or more subsets of clients such that the timelock node A is identified to be assigned to the clients A, B, and C, the timelock node B is identified to be assigned to the clients A, B, and C, the timelock node C is identified to be assigned to the clients B and D, the timelock node D is identified to be assigned to the clients C and D, and the timelock node E is identified to be assigned to the clients A and D. That is, two timelock nodes A and B are identified to be assigned to all three smaller clients A, B, and C while three timelock nodes C, D, and E are identified to be assigned to the larger client D and one of the three smaller clients A, B, and C. Other distributions of timelock/operation nodes among clients are contemplated.

In some embodiments, the subset engine 120 may divide the operation nodes among the clients such that the loads among subsets of operation nodes are equal/similar to each other. In some embodiments, the subset engine 120 may divide the operation nodes among the clients such that the loads among subsets of operation nodes are similar to proportional to the number of operation nodes within the subsets of operation nodes. In some embodiments, the subset engine 120 may divide the operation nodes among the clients based on one or more rules specific to particular client(s) and/or particular operation node(s). For example, a particular client may be designated to be assigned to a subset of timelock nodes by itself, with a certain number of other clients, with one or more clients of particular type/identify, and/or based on other information. As another example, the subset engine 120 may have a minimum and/or a maximum number of timelock nodes to be assigned to a particular client, a particular type of client, and/or a particular number of clients, and/or may have a minimum and/or maximum number of clients to be placed within a subset of clients. Other rules for dividing operation nodes into subsets of operation nodes for assignment to subsets of clients are contemplated.

The subset engine 120 may identify subsets of operation nodes for subsets of clients to distribute the operations for the clients among the subsets of operation nodes. For example, the subset engine 120 may identify a given subset of timelock nodes to be assigned to a given subset of clients. A subset of timelock nodes may refer to one or more of the timelock nodes that are running (e.g., timelock nodes run by the node engine 114). A subset of clients may refer to one or more of the clients that uses one or more timelock operations (e.g., clients identified by the client engine 116). For instance, the node engine 114 may run a set of timelock nodes including multiple timelock nodes, and the client engine may identify a set of clients including multiple clients. The subset engine 120 may identify a part of the set of timelock nodes as a subset of timelock nodes to be assigned to some of clients in the set of clients. In some embodiments, a subset of timelock nodes identified to be assigned to a subset of clients may include an odd number of timelock nodes. Identification of subsets of timelock nodes for assignment to subsets of clients may provide for identification smaller size clusters of timelock nodes for smaller groups of clients. Individual clusters of timelock nodes may provide timelock operations for individual groups of clients.

In some embodiments, constraints on subsets of operation nodes and/or subsets of clients may be determined based on user input. Constraints may include simple limitations on sizes of subsets. For example, user input may identify specific sizes of subsets of operation nodes and/or subsets of clients. As another example, user input may change the fault tolerance level, the expected/desired speed of operations (e.g., acceptable latency for timelock operations), and/or other parameters relating to operations, and the size of subsets of operation nodes and/or the size of subsets of clients may be determined based on user defined parameters relating to operations. In some embodiments, constraints on subsets of operation nodes may be specific to identity/type of clients/services using operations. For example, user input may identify specific subsets of clients that must be served by the same timelock nodes or must never be served by the same timelock nodes. In some embodiments, constraints on subsets of operation nodes may be tied to priority (e.g., service priority).

The subset engine 120 may identify subsets of operation nodes to be assigned to subsets of clients at regular intervals or irregular intervals. The subset engine 120 may identify subsets of operation nodes to be assigned to subsets of clients based on a scan of processes, events, and/or other information relating to the clients. The subset engine 120 may identify subsets of operation nodes to be assigned to subsets of clients based on a scan of processes, events, and/or other information relating to the operation nodes. The subset engine 120 may identify subsets of operation nodes to be assigned to subsets of clients based on user input (e.g., command to distribute/redistribute timelock nodes among clients). For example, the subset engine 120 may identify subsets of timelock nodes to be assigned to subsets of clients based on identification of the client, changes in the number of the clients (e.g., addition of a new client, removal of an existing client, suspension of a client), and/or other information relating to the clients. As another example, the subset engine 120 may identify subsets of timelock nodes to be assigned to subsets of clients based on loads of the timelock nodes/subsets of timelock nodes (e.g., pulled at regular/irregular interval to determine actual loads on the timelock nodes), changes in the number of the timelock nodes (e.g., addition of a new timelock node, removal of an existing timelock node, suspension of a timelock node), and/or other information.

Change in distribution of operation nodes to clients based on change in number of operation nodes may require recalculation of balancing among the operation nodes. For example, if the number of timelock nodes is reduced, the balancing of timelock operations among the timelock nodes may need to be recalculated to determine redistribution of timelock nodes among clients. In some embodiments, redistribution of timelock nodes among clients may require suspension of timelock requests/operations, division of timelock nodes among clients, and continuation of timelock requests/operations. In some embodiments, redistribution of timelock nodes may be performed without suspension of timelock requests/operations. If the number of timelock nodes is increased, the additional timelock node(s) may be assigned with or without recalculation of balancing among the timelock nodes. If the additional timelock node(s) are assigned without recalculation of balancing among the timelock nodes, the balancing of timelock nodes may be performed at a later time, such as based on criteria discussed above.

The assignment engine 122 may be configured to assign the subset(s) of operation nodes to the subset(s) of clients such that a given subset of operation nodes is assigned to perform one or more of the operations for a given subset of clients. The assignment engine 122 may assign the subsets of operation nodes identified by the subset engine 120 such that smaller clusters of operation nodes are assigned to perform operations for smaller groups of clients. Thus, a subset of operation nodes are assigned to serve one or more particular clients for operations. For example, referring to the example of clients A, B, C, and D, and five timelock nodes A, B, C, D, and E, the assignment engine 122 may assign subsets of the timelock nodes A, B, C, D, and E to subsets of the clients A, B, C, D based on the identification of the subsets of timelock nodes and subsets of clients by the subset engine 120. For example, the assignment engine 122 may assign the timelock node A to the clients A, B, and C, the timelock node B to the clients A, B, and C, the timelock node C to the clients B and D, the timelock node D to the clients C and D, and the timelock node E to the clients A and D. That is, two timelock nodes A and B are assigned to all three smaller clients A, B, and C while three timelock nodes C, D, and E are assigned to the larger client D and one of the three smaller clients A, B, and C. Other distributions of operation nodes among clients are contemplated.

The map of assignment of subsets of operation nodes to subsets of clients may be visualized (and/or otherwise represented) as a bipartite graph. A bipartite graph may include a set of graph nodes separated into two sets such that no two graph nodes within the same set are connected. That is, a map of assignment of subsets of operation nodes to subsets of clients may include a set of graph nodes representing the operation nodes and a set of graph nodes representing the clients. No graph nodes representing operation nodes may be connected to each other, and no graph nodes representing client nodes may be connected to each other. In some embodiments, the map of assignment of subsets of operation nodes to subsets of clients may be visualized as an incomplete bipartite graph. That is, every graph node representing the clients may not be connected to every graph node representing the operation nodes.

Figure 2:
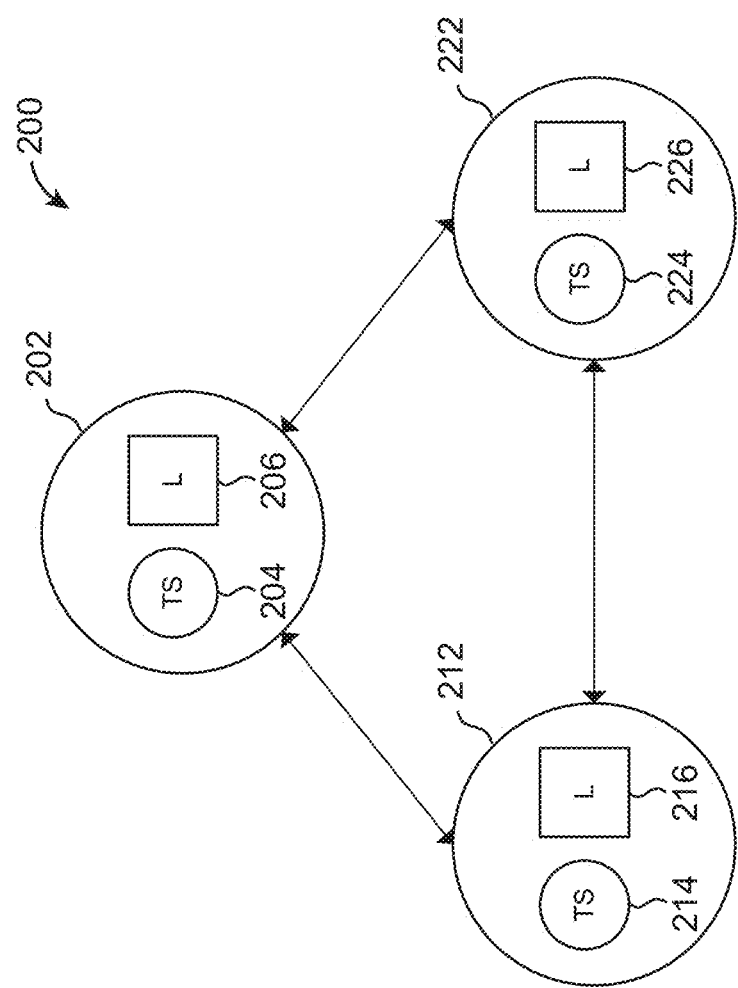
FIG. 2 illustrates an example environment for providing timelock operations, in accordance with various embodiments.

FIG. 2 illustrates an example environment 200 for providing timelock operations. The example environment 200 may be implemented within one or more processors (e.g., timelock processor(s)). The example environment 200 may include three (dedicated) timelock nodes 202, 212, 222. The timelock nodes 202, 212, 222 may form a subset of timelock nodes. Individual timelock nodes 202, 212, 222 may contain implementations of timestamp services 204, 214, 224 and timelock services 206, 216, 226. Individual timelock nodes 202, 212, 222 (timestamp services 204, 214, 224 and timelock services 206, 216, 226) may communicate with one another to come to a consensus on values of timestamps (a single value or a range of values) to be issued and/or to come to a consensus on whether a lock operation is to be performed (e.g., assigning, refreshing, removing a lock on a timestamp).

In some embodiments, one of the timelock nodes 202, 212, 222 (timestamp services 204, 214, 224) may be selected to be a leader for provision of timestamps. In some embodiments, one of the timelock nodes 202, 212, 222 (timelock services 206, 216, 226) may be selected to be a leader for provision of timelock. In some embodiments, the same node may be selected to be a leader for provision of timestamp and timelock.

Use of a separate processor including the timelock nodes 202, 212, 222 may enable a user/client to obtain timestamp/lock via communication with a single entity rather than with multiple entities. Use of dedicated timelock nodes 202, 212, 222 provides segregation of codes for timestamp/timelock from other codes, and enables changes to the timelock codes (e.g., updates, optimization) without requiring rebuild of other codes.

Figure 3:
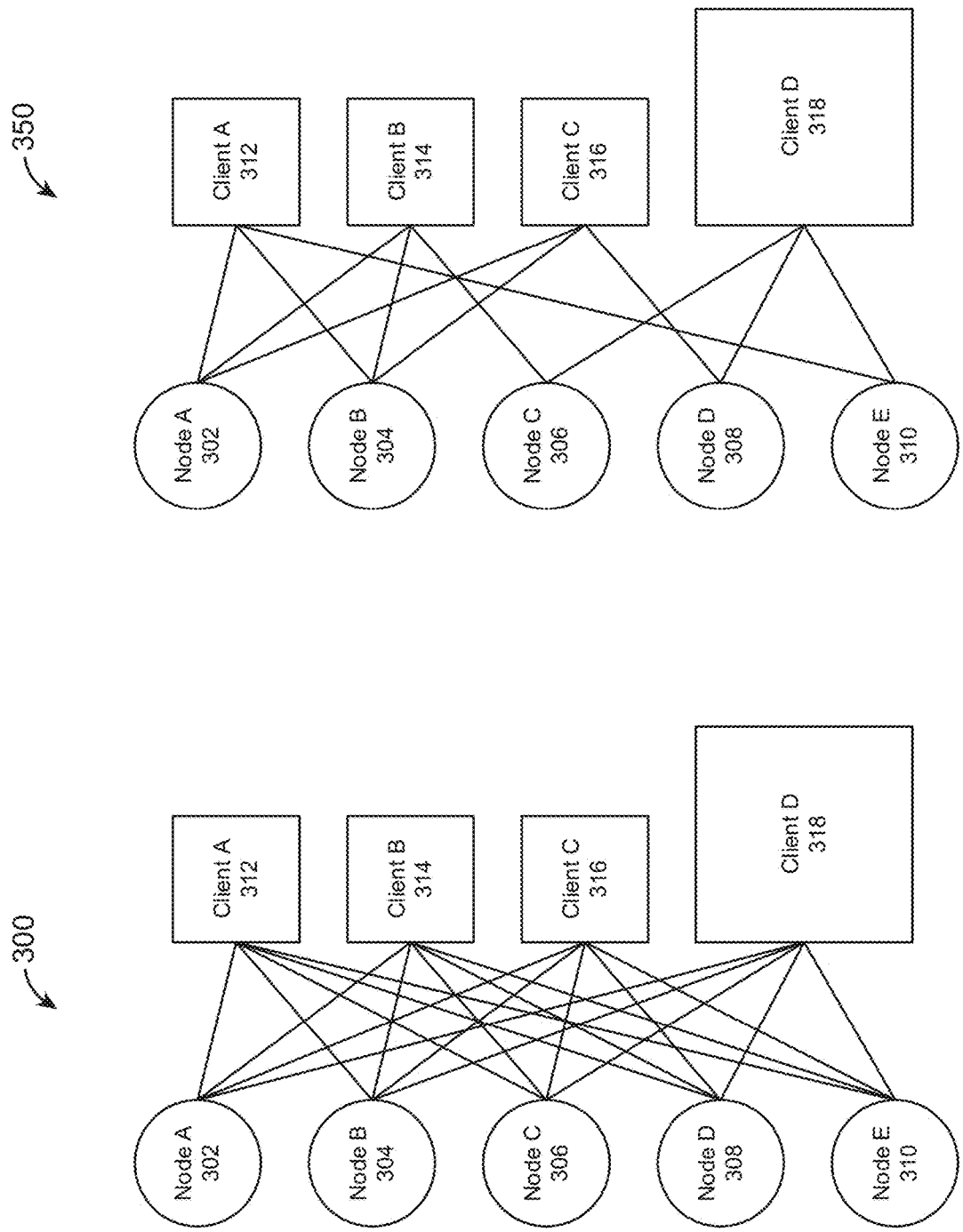
FIG. 3 illustrates example distributions of clients among operation nodes, in accordance with various embodiments.

FIG. 3 illustrates example distributions of clients among nodes 300, 350, in accordance with various embodiments. For example, the distribution 300 may represent an assignment of timelock nodes to clients without balancing of timelock operations. Without balancing of timelock operations, every timelock node (a node A 302, a node B 304, a node C 306, a node D 308, and a node E 310) may be assigned to every client (a client A 312, a client B 314, a client C 316, and a client D 318), forming a complete bipartite graph. The loads of operations associated with the clients A, B, C may be the same/similar to each other, while the loads of operations associated with the client D may be larger than other loads. In the case of the distribution 300, performing operations may become expensive (e.g., increase in latency of timelock operation) as individual operations of the clients 312, 314, 316, 318 may require consensus among all nodes 302, 304, 306, 308, 310. In some embodiments, the assignment of nodes to clients without balancing of operations may be arbitrary and/or form an incomplete bipartite graph. However, such a distribution may result in unbalanced operations where one or more of the nodes may be responsible for disproportionate amounts of operations, leading to overloading of one or more nodes and/or increase in latency of operation of one or more nodes.

The distribution 350 may represent an assignment of nodes to clients with balancing of operations. With balancing of operations, node A 302 may be assigned to the clients A 312, B 314, and C 316, the node B 304 may be assigned to the clients A 312, B 314, and C 316, the node C 306 may be assigned to the clients B 314 and D 318, the node D 308 may be assigned to the clients C 316 and D 318, and the node E 310 may be assigned to the clients A 312 and D 318, forming an incomplete bipartite graph. That is, two nodes 302, 304 are assigned to all three smaller clients 312, 314, 316 while three nodes 306, 308, 310 are assigned to the larger client D 318 and one of the three smaller clients 312, 314, 316. Such distribution of operations (e.g., timelock operations) may enable horizontal scaling of operations by partitioning the distribution of nodes/clients into clusters based on loads of operations and generating an efficient map/graph of the distribution.

Figure 4:
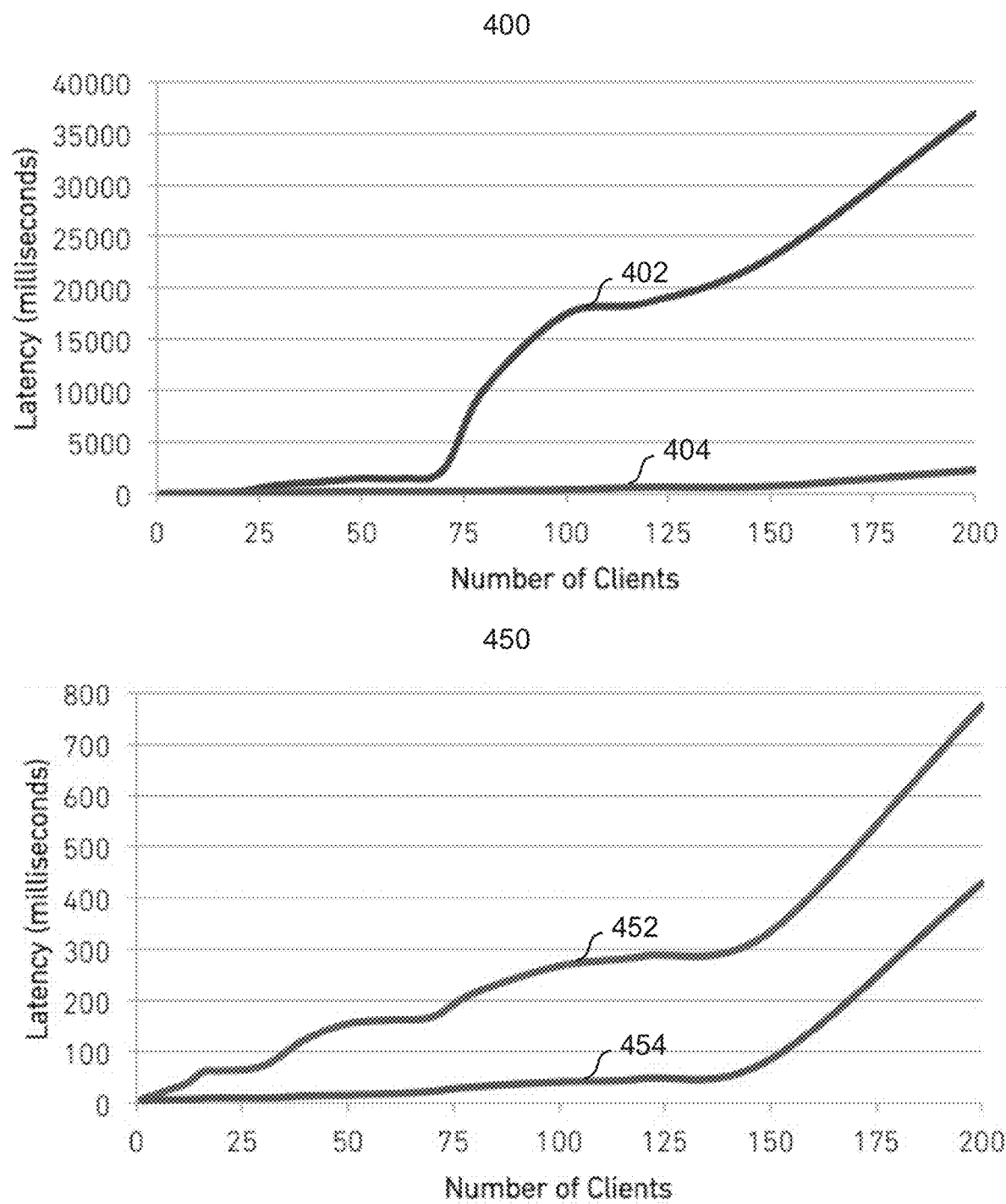
FIG. 4 illustrates example results of balancing loads of timelock operations, in accordance with various embodiments.

FIG. 4 illustrates example results of balancing loads of timelock operations, in accordance with various embodiments. A graph 400 provides comparison of P99 latency measurements for timelock operations with and without balancing of timelock operations and a graph 450 provides comparison of P50 latency measurements for timelock operations with and without balancing of timelock operations. Lines 402, 452 represent latency measurements for timelock operations without balancing loads of timelock operations for a ten-node timelock cluster with different numbers of clients, with individual clients running thirty threads. The line 402 shows that base P99 latency measurement of timelock operations without balancing of timelock operations reaches one second for thirty clients, and increases dramatically around seventy clients. Increasing the number of timelock nodes would results in even greater latency measurements. Lines 404, 454 represent latency measurements for timelock operations with balancing of timelock operations for mini-cluster size of three timelock nodes, with different numbers of clients, with individual clients running thirty threads. As shown in the graphs 400, 450, balancing loads of timelock operations results in reduced P99 latency and P50 latency. For instance, compared to non-balanced timelock node operations, five times as many clients may be supported with P99 latency of less than one second with balanced timelock nodes operations. For a hundred and fifty clients, balancing loads of timelock operations results in speedup factor of about 30× for P99 latency. Additionally, a positive throughput gradient is observed for balanced timelock node operations, demonstrating that balanced timelock node clusters may be horizontally scaled.

Figure 5:
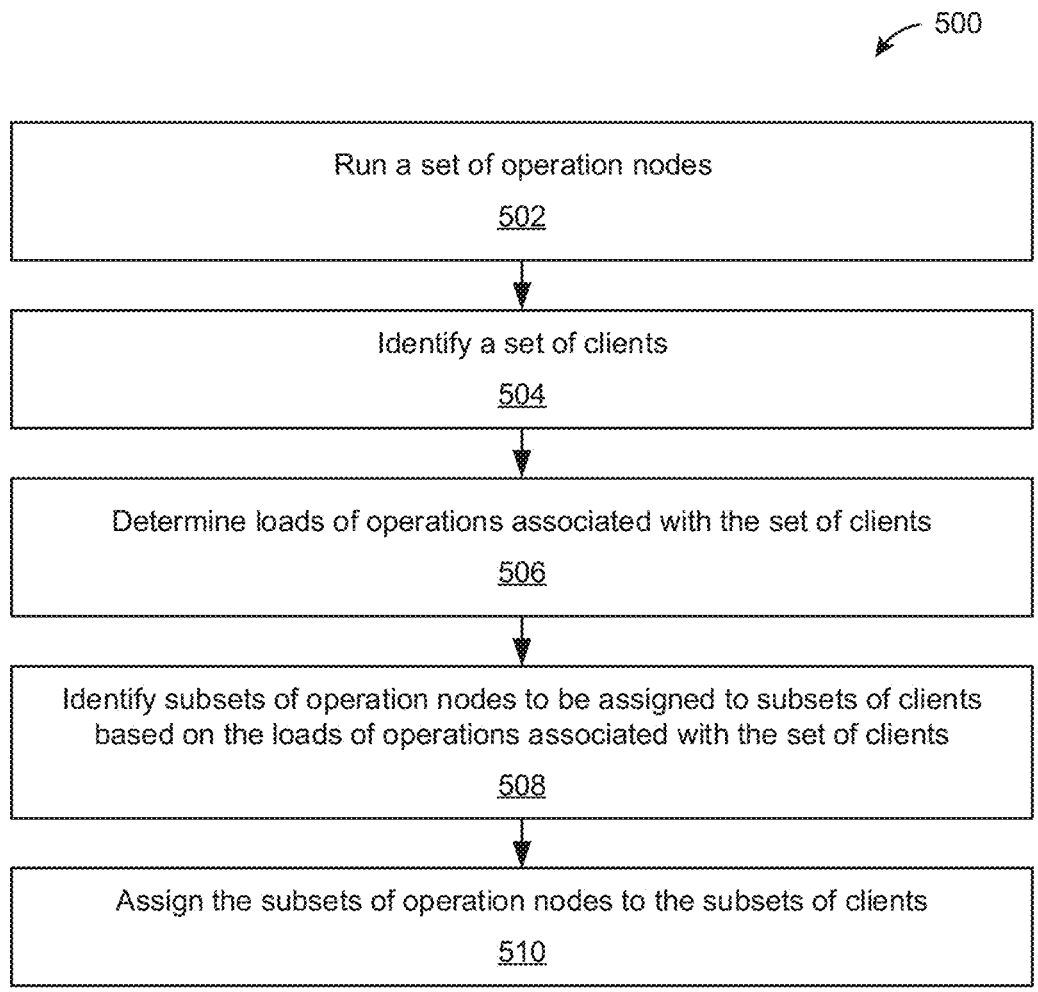
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a set of operation nodes may be run. The set of operation nodes may include operation nodes configured to perform operations. At block 504, a set of clients may be identified. The set of clients may use one or more of the operations. At block 506, Loads of operations associated with the set of clients may be determined. At block 508, Subsets of operation nodes to be assigned to subsets of clients may be identified based on the loads of operations associated with the set of clients. The subsets of operation nodes may include a given subset of operation nodes to be assigned to a given subset of clients. At block 510, the subsets of operation nodes may be assigned to the subsets of clients. The given subset of operation nodes may be assigned to perform one or more of the operations for the given subset of clients.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
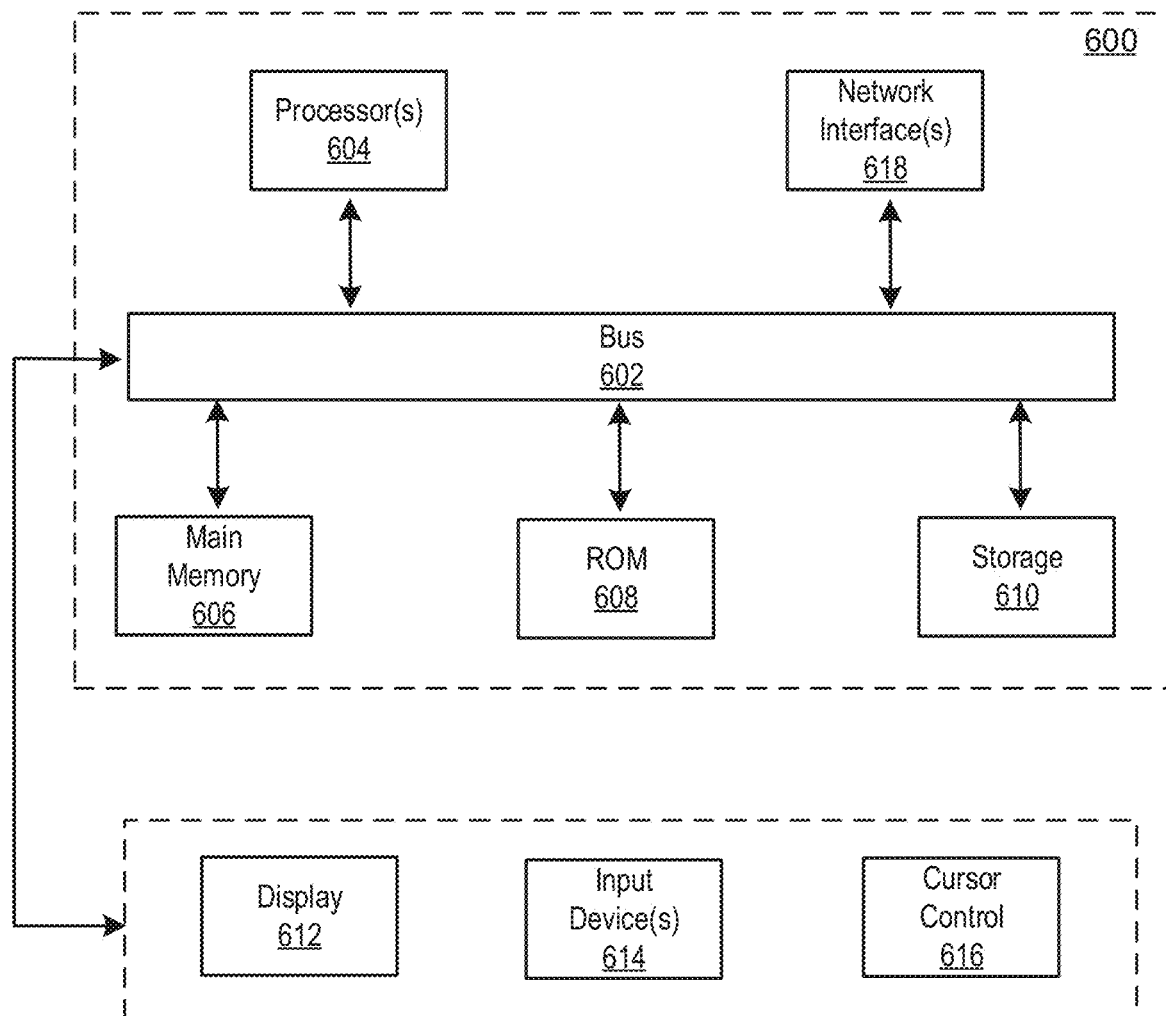
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   one or more processors;
   a memory storing instructions that, when executed by the one or more processors, cause the system to perform:
      running a set of operation nodes, the set of operation nodes including operation nodes configured to perform operations;
      identifying a set of clients that uses one or more of the operations;
      determining loads of operations associated with the set of clients;
      identifying subsets of operation nodes to be assigned to subsets of clients based on the loads of operations associated with the set of clients, comprising:
         determining a cost from obtaining a consensus among the subsets of operation nodes during one or more operations of the subsets of clients; and
         identifying subsets of operation nodes to be assigned to subsets of clients based on the determined cost,
      the subsets of operation nodes including a given subset of operation nodes to be assigned to a given subset of clients; and
      assigning the subsets of operation nodes to the subsets of clients such that the given subset of operation nodes is assigned to perform one or more of the operations for the given subset of clients.

2. The system of claim 1, wherein the loads of operations are determined based on historical operation usage information for the set of clients.

3. The system of claim 2, wherein the historical operation usage information includes information relating to request rates, processing loads, and latency measurements of historical operation usage by the set of clients.

4. The system of claim 1, wherein the operations include assigning a timestamp to a transaction associated with a given client, assigning a lock on the timestamp, refreshing the lock on the timestamp during execution of the transaction, and removing the lock on the timestamp.

5. The system of claim 4, wherein one or more of the operations are performed by the given subset of operation nodes based on a consensus of operation nodes within the given subset of operation nodes.

6. The system of claim 4, wherein the transaction is facilitated by a transaction layer built on top of a key value store.

7. A method implemented by a computing system including one or more processors and storage media storing machine-readable instructions, wherein the method is performed using the one or more processors, the method comprising:
   running a set of operation nodes, the set of operation nodes including operation nodes configured to perform operations;
   identifying a set of clients that uses one or more of the operations;
   determining loads of operations associated with the set of clients;
   identifying subsets of operation nodes to be assigned to subsets of clients based on the loads of operations associated with the set of clients, comprising:
      determining a cost from obtaining a consensus among the subsets of operation nodes during one or more operations of the subsets of clients; and
      identifying subsets of operation nodes to be assigned to subsets of clients based on the determined cost,
   the subsets of operation nodes including a given subset of operation nodes to be assigned to a given subset of clients; and
   assigning the subsets of operation nodes to the subsets of clients such that the given subset of operation nodes is assigned to perform one or more of the operations for the given subset of clients.

8. The method of claim 7, wherein the loads of operations are determined based on historical operation usage information for the set of clients.

9. The method of claim 8, wherein the historical operation usage information includes information relating to request rates, processing loads, and latency measurements of historical operation usage by the set of clients.

10. The method of claim 7, wherein the operations include assigning a timestamp to a transaction associated with a given client, assigning a lock on the timestamp, refreshing the lock on the timestamp during execution of the transaction, and removing the lock on the timestamp.

11. The method of claim 10, wherein one or more of the operations are performed by the given subset of operation nodes based on a consensus of operation nodes within the given subset of operation nodes.

12. The method of claim 10, wherein the transaction is facilitated by a transaction layer built on top of a key value store.

13. A non-transitory computer readable medium comprising instructions that, when executed, cause one or more processors to perform:
- running a set of operation nodes, the set of operation nodes including operation nodes configured to perform operations;
- identifying a set of clients that uses one or more of the operations;
- determining loads of operations associated with the set of clients;
- identifying subsets of operation nodes to be assigned to subsets of clients based on the loads of operations associated with the set of clients, comprising:
  - determining a cost from obtaining a consensus among the subsets of operation nodes during one or more operations of the subsets of clients; and
  - identifying subsets of operation nodes to be assigned to subsets of clients based on the determined cost,
- the subsets of operation nodes including a given subset of operation nodes to be assigned to a given subset of clients; and
- assigning the subsets of operation nodes to the subsets of clients such that the given subset of operation nodes is assigned to perform one or more of the operations for the given subset of clients.

14. The non-transitory computer readable medium of claim 13, wherein the loads of operations are determined based on historical operation usage information for the set of clients.

15. The non-transitory computer readable medium of claim 14, wherein the historical operation usage information includes information relating to request rates, processing loads, and latency measurements of historical operation usage by the set of clients.

16. The non-transitory computer readable medium of claim 13, wherein the operations include assigning a timestamp to a transaction associated with a given client, assigning a lock on the timestamp, refreshing the lock on the timestamp during execution of the transaction, and removing the lock on the timestamp.

17. The non-transitory computer readable medium of claim 16, wherein one or more of the operations are performed by the given subset of operation nodes based on a consensus of operation nodes within the given subset of operation nodes.

18. The system of claim 1, wherein the subsets of operation nodes to be assigned to subsets of clients are identified further based on whether any of the clients or any of the operation nodes is suspended, and wherein the cost is determined based on a latency of a timelock operation.

19. The system of claim 1, wherein the subsets of operation nodes to be assigned to subsets of clients are identified further based on a size of the subsets of operation nodes and a size of the subsets of clients.

20. The system of claim 1, wherein the instructions further cause the system to perform:
- selecting an operation node of the subsets of operation nodes to be a leader for provision of timestamps and timelock.

* * * * *